United States Patent
Tashiro et al.

[11] Patent Number: 6,011,167
[45] Date of Patent: Jan. 4, 2000

[54] POLYORGANOSILOXAZANES AND PROCESS FOR THE PREPARATION THEREOF

[75] Inventors: Yuuji Tashiro; Osamu Funayama, both of Iruma-gun, Japan

[73] Assignee: Tonen Corporation, Tokyo, Japan

[21] Appl. No.: 09/125,874

[22] PCT Filed: Dec. 26, 1997

[86] PCT No.: PCT/JP97/04900

§ 371 Date: Aug. 26, 1998

§ 102(e) Date: Aug. 26, 1998

[87] PCT Pub. No.: WO98/29475

PCT Pub. Date: Jul. 9, 1998

[30] Foreign Application Priority Data

Dec. 27, 1996 [JP] Japan .................................. 8-351064

[51] Int. Cl.$^7$ ................. C07F 7/02; C07F 7/10; C07F 7/18

[52] U.S. Cl. .................. 556/410; 556/433; 556/434; 556/435; 556/450; 556/469; 556/471; 501/154; 528/10; 528/38; 528/43

[58] Field of Search ..................... 556/410, 433, 556/467, 469, 450; 501/154; 528/10, 38, 43

[56] References Cited

FOREIGN PATENT DOCUMENTS

| 0 424 279 A1 | 4/1991 | European Pat. Off. . |
| 6-18885 | 3/1994 | Japan . |
| 7-18080 | 1/1995 | Japan . |

*Primary Examiner*—Johann Richter
*Assistant Examiner*—Jane C. Oswecki
*Attorney, Agent, or Firm*—Michael N. Meller; Eugene Lieberstein

[57] ABSTRACT

Polyorganosiloxazane is provided which is capable of being converted into a ceramic material having low dielectric constant. The polymer according to the present invention is characterized by comprising the main repeating units of —($RSiN_3$)—, —($RSiN_2O$)—, —($RSiNO_2$)— and —($RSiO_3$)—, wherein, R represents an alkyl, alkenyl, cycloalkyl, aryl, alkylamino or alkylsilyl group, and by having a number-average molecular weight ranging from 300 to 100,000. The polyorganosiloxazane of the present invention has superior thermal resistance, and a ceramic material obtainable by firing the same at a predetermined temperature shows very low specific dielectric constant of 2.7 or less, making it useful particularly as a material in electronics.

20 Claims, 4 Drawing Sheets

POLYORGANOSILOXAZANES AND PROCESS FOR THE PREPARATION THEREOF

TECHNICAL FIELD

The present invention relates to a novel polyorganosiloxazane. The polyorganosiloxazane of the present invention exhibits superior thermal resistance, and a ceramic material obtained by firing at a predetermined temperature in particular exhibits an extremely low specific dielectric constant, making it useful particularly in the field of electronic materials, coupled with a superior thermal resistance.

BACKGROUND ART

Coating materials of the prior art, which are used to give thermal resistance, corrosion resistance and electrical characteristics (insulating properties, low dielectric properties, etc.) to metal materials, inorganic materials and electronic material substrates, consist primarily of those made from polyorganosiloxane resin (silicone resin).

More recently, research has been conducted on a film originating in polyorganosiloxane in which the structure is controlled in the form of a low dielectric material for use as a semiconductor interlayer insulating film.

Although ceramic films of the prior art originating in polyorganosiloxane exhibit low specific dielectric constants on the order of 2.7–3.0, as the firing temperature increases, the specific dielectric constant also tends to increase. For example, in polyorganosiloxane having a methyl group in its side chain, thermal cleavage of the Si—Me group occurs at about 350° C., and $SiO_2$ formation progresses remarkably at high temperatures of 400° C. and above. Thus, the dielectric constant increases as film density rises. In addition, since contraction of the film occurs as $SiO_2$ formation progresses, cracking and other problems occur.

Since heat at a maximum of about 450° C. is applied in the semiconductor production process, there was a problem with the thermal resistance even in the case of conventional siloxane-based polymers.

Accompanying the growing use of ICs featuring higher levels of integration and higher processing speeds, these coating materials, and semiconductor interlayer insulating films in particular, are being required to demonstrate even lower dielectric constants.

Polysiloxane produced by a complexing method using halosilane and ammonia is described in Japanese Examined Patent Publication No. 6-18885 (Japanese Patent No. 1897366) filed by the present applicant. However, there is no description of polyorganosiloxazane containing organic groups in substantially all of its repeating units. In addition, said polysiloxazane is a polymer for producing silicon oxynitride fibers, and there have been no studies conducted whatsoever on the dielectric constant of that formed into a ceramic material.

The object of the present invention is to provide a precursor polymer that allows a ceramic material to be obtained that exhibits a low specific dielectric constant of, for example, 2.7 or less, even in the case of being treated at high temperatures of, for example, 400° C. and above. Another object of the present invention is to provide a precursor polymer that allows control of this specific dielectric constant.

DISCLOSURE OF THE INVENTION

As a result of repeated and earnest studies to solve the above-mentioned problems, the inventors of the present invention found that, in the case of converting polyorganosiloxazane having a specific structure into a ceramic material under specific conditions, the resulting ceramic material exhibits a specific dielectric constant of 2.7 or less. Moreover, the inventors of the present invention also found that, by changing the bonding composition in said polyorganosiloxazane, it is possible to control the specific dielectric constant after conversion into a ceramic material.

According to the present invention:

(1) Polyorganosiloxazane is provided having a number average molecular weight ranging from 300 to 100,000 and containing as its main repeating units —(RSiN$_3$)—, —(RSiN$_2$O)—, —(RSiNO$_2$)— and —(RSiO$_3$)— (wherein, R represents an alkyl group, alkenyl group, cycloalkyl group, aryl group, alkylamino group or alkylsilyl group).

In addition, according to the present invention:

(2) A method of preparing polyorganosiloxazane is provided comprising reacting an organic halosilane, represented by the general formula $R_nSiX_{4-n}$ (wherein, R represents an alkyl group, alkenyl group, cycloalkyl group, aryl group, alkylamino group or alkylsilyl group, X represents a halogen atom, and n represents an integer of 1 or 2), with ammonia and water.

Moreover, according to the present invention:

(3) A ceramic material is provided having a specific dielectric constant of 2.7 or less obtained by converting to a ceramic material polyorganosiloxazane having a number average molecular weight ranging from 300 to 100,000 and containing as its main repeating units —(RSiN$_3$)—, —(RSiN$_2$O)—, —(RSiNO$_2$)— and —(RSiO$_3$)— (wherein, R represents an alkyl group, alkenyl group, cycloalkyl group, aryl group, alkylamino group or alkylsilyl group).

Since the polyorganosiloxazane according to the present invention allows production of a ceramic material demonstrating a low specific dielectric constant of, for example, 2.7 or less and, depending on the particular case, on the order of 2.5 to 2.2, even in the case of firing at high temperatures (for example, 400° C. and above), it is suited for use as a coating for electronic materials such as highly integrated electronic devices, and particularly for use as a precursor of semiconductor interlayer insulating films.

Although not desiring to be restricted theoretically, since the polyorganosiloxazane according to the present invention has thermally stable Si—N bonds in its main chain and the side chain R groups are composed substantially of organic groups (including the most thermally stable Si—Ph bond in the case of R being a phenyl group in particular), leading to the polymer skeleton structure being maintained even during heat treatment at 400° C. and above, and density of the ceramic material is suppressed, the orientation polarization decreases and this is considered to enable it to exhibit a low dielectric constant after being converted into a ceramic material. On the other hand, in the case of polysiloxane, even if the side chains consist only of Si—Ph bonds, polymer crosslinking proceeds. Since cleavage of the Si—O bonds and the increased density of the structure occur during heat treatment at 400° C. and above, the dielectric constant increases to about 3.2 after being converted into a ceramic material.

In addition, the specific dielectric constant is also affected by electronic polarization within the polymer. In particular, groups having a double bond such as a phenyl group are susceptible to electronic polarization. Consequently, they contribute to an increase in the specific dielectric constant. However, in the polyorganosiloxazane according to the present invention, groups that are able to cause this electronic polarization are present not in the main polymer chain, but rather in the side chains, while the electron status in the vicinity of these electronic polarizing groups is changed due to N—Si—O bonds contained in the main chain. Consequently, electronic polarization by such groups is suppressed and accordingly, increases in the specific dielectric constant of the polyorganosiloxazane according to the present invention are also suppressed.

In this manner, in the polyorganosiloxazane of the present invention, it is believed that Si—N bonds contribute to decreasing orientation polarization by suppressing the increased density of the ceramic material during heat treatment, and that, N—Si—O bonds contribute to suppression of electron polarization by electron polarizing groups. Thus, in the case of attempting to achieve optimization of the specific dielectric constants of individual specific materials, it can be understood that the bond composition (Si—O bond/Si—N bond ratio) of the polyorganosiloxazane according to the present invention should be designed in consideration of this point of view.

BEST MODE FOR CARRYING OUT THE INVENTION

The polyorganosiloxazane according to the present invention is obtained by reacting an organic halosilane represented by the general formula $R_nSiX_{4-n}$ with ammonia and water. In the above-mentioned formula, R represents an alkyl group, alkenyl group, cycloalkyl group, aryl group, alkylamino group or alkylsilyl group, X represents a halogen atom and n represents 1 or 2.

Examples of alkyl groups include alkyl groups having 1–7 carbon atoms, preferably 1–5 carbon atoms, and more preferably 1 or 2 carbon atoms, specific examples of which include a methyl group, ethyl group, propyl group, butyl group, pentyl group, hexyl group and heptyl group. A particularly preferable alkyl group is a methyl group.

Examples of alkenyl groups include alkenyl groups having 2–7 carbon atoms and preferably 2–5 carbon atoms, specific examples of which include a vinyl group and allyl group. A particularly preferably alkenyl group is a vinyl group.

Examples of cycloalkyl groups include cycloalkyl groups having 5–7 carbon atoms, specific examples of which include a cyclopentyl group, cyclohexyl group and cycloheptyl group.

Examples of aryl groups include aryl groups having 6–18 carbon atoms, and preferably 6–9 carbon atoms, specific examples of which include a phenyl group, tolyl group, xylyl group, cumenyl group, benzyl group, phenethyl group, biphenyl group and naphthyl group. A particularly preferable aryl group is a phenyl group.

Examples of alkylamino groups (mono- and di-substituted forms) as well as alkylsilyl groups (mono-, di- and tri-substituted forms) preferably are those having 1–5 carbon atoms.

Examples of the halogen of X include F, Cl, Br and I. A particularly preferable halogen is Cl.

n is 1 or 2, and n=1 is particularly preferable.

Specific examples of organic halosilanes represented by the general formula $R_nSiX_{4-n}$ include methyltrichlorosilane, trichlorosilane, vinyltrichlorosilane, cyclohexyltrichlorosilane and phenyltrichlorosilane. Particularly preferable examples of organic halosilanes include methyltrichlorosilane, phenyltrichlorosilane and vinyltrichlorosilane.

The above-mentioned organic halosilanes can be reacted with ammonia and water in a reaction solvent as necessary. There are no particular limitations on the reaction solvent used, and a Lewis base, a non-reactive solvent or a mixture of these may be used.

Examples of Lewis bases include tertiary amines (trialkylamines such as trimethylamine, dimethylethylamine, diethylmethylamine and triethylamine, pyridine, picoline, dimethylaniline and their derivatives), as well as secondary amines having steric hindrance, phosphine, stibine, arsine and their derivatives. Preferable examples of Lewis bases include those that have a low boiling point and are less basic than ammonia (trimethylphosphine and triethylphosphine), while pyridine and picoline are particularly preferable in terms of their ease of handling.

Examples of non-reactive solvents include aliphatic hydrocarbon, alicyclic hydrocarbon, aromatic hydrocarbon and other hydrocarbon-based solvents, halogenated hydrocarbons such as halogenated methane, halogenated ethane and halogenated benzene, and ethers such as aliphatic ethers and alicyclic ethers. Preferable examples of non-reactive solvents include methylene chloride, chloroform, carbon tetrachloride, ethylene chloride, ethylidene chloride, trichloroethane, tetrachloroethane and other halogenated hydrocarbons, ethylether, isopropylether, ethylbutylether, butylether, 1, 2-dioxyethane, dioxane, dimethyldioxane, tetrahydrofuran and other ethers, and pentane, hexane, isohexane, methylpentane, heptane, isoheptane, octane, isooctane, cyclopentane, methylcyclopentane, cyclohexane, methylcyclohexane, benzene, toluene, xylene, ethylbenzene, N-methyl-2-pyrrolidone, diglyme and other hydrocarbons. Dichloromethane and xylene are used preferably in consideration of safety.

The above-mentioned organic halosilane monomer $R_nSiX_{4-n}$ is reacted with ammonia and water in the presence of a solvent like that described above as necessary. Ammonia contributes to formation of the Si—N bond, while water contributes to formation of the Si—O bond. There are no particular limitations on the order of the reaction of ammonia and water with said monomer. Namely, water can be added to the reaction mixture after reacting said monomer with ammonia, ammonia can be added to the reaction mixture after reacting said monomer with water, or said monomer can be reacted with ammonia and water simultaneously.

Water may be reacted by dropping in alone, or it may be reacted by dissolving or dispersing in advance in the above-mentioned solvent. In addition, ammonia can be reacted by dispersing in an inert gas such as nitrogen gas and then blowing into a reaction solvent containing organic halosilane.

The reaction temperature of ammonia and water is typically within the range of −80° C. to 50° C., and preferably −20° C. to 10° C. If the reaction temperature is lower than −80° C., the melting point of the solvent is reached, thereby resulting in restrictions on the solvents that can be used. In addition, it is also not economically preferable to use a reaction temperature of −80° C. or lower. In addition, if the reaction temperature exceeds 50° C., the reaction proceeds violently causing the occurrence of gelling of the reaction product and lowering yield.

There are no particular limitations on the reaction pressure, and the reaction should be carried out at normal pressure.

The reaction time is typically 10 to 600 minutes, and preferably 30 to 180 minutes in the case of reacting organic halosilane and water, and typically 10 to 180 minutes, and preferably 20 to 120 minutes in the case of reacting organic halosilane and ammonia.

The relative amounts of ammonia and water are 10 mol % to 90 mol % and preferably 20 mol % to 80 mol %, and the total number of moles of ammonia and water is 100 mol %, based on the respective required number of moles as calculated from the number of moles of organic halosilane monomer. Here, the required number of moles as calculated from the number of moles of organic halosilane monomer (number of moles of water and ammonia required for forming the Si—O and Si—N bonds) varies depending on the value of n in the above-mentioned general formula $R_nSiX_{4-n}$. Namely, this is because, when n is 1, 3 moles of Si—O bonds and Si—N bonds are formed from 1 mole of organic halosilane monomer ($RSiX_3$), and when n is 2, 2 moles of Si—O bonds and Si—N bonds are formed from 1 mole of organic halosilane monomer ($R_2SiX_2$). Moreover, since 3 moles of Si—N bonds are formed from 1 mole of ammonia, and 2 moles of Si—O bonds are formed from 1 mole of water, once the amount of either water or ammonia is determined, the amount required of the other is also determined. For example, in the case of reacting 0.5 moles of water with 1 mole of organic halosiloxane in which n is 1 ($RSiX_3$), since 1 mole of Si—O bonds is formed, approximately 0.67 moles of ammonia are required in order to form the remaining 2 moles of Si—N bonds. In this case, the percentage of Si—O bonds among the bonds of Si atoms that compose the main polymer chain of the resulting polyorganosiloxazane [Total no. of Si—O bonds/Total (no. of Si—O bonds+no. of Si—N bonds)] is approximately 33 mol %.

In the case of first reacting ammonia or water with organic halosilane monomer, the desired polyorganosiloxazane can be obtained by using the required amount of ammonia or water within the above-mentioned range relative to the number of moles of said organic halosilane monomer, and then using the other in a stoichiometrically excessive amount. In general, it is convenient to employ a procedure in which, after reacting an amount of water within the above-mentioned range relative to the number of moles of organic halosilane monomer to be reacted with said organic halosilane monomer, an excess amount of ammonia is introduced into the reaction system.

As will be described later, it is preferable that the amount of Si—O bonds among the bonds of Si atoms that compose the main polymer chain of the polyorganosiloxazane of the present invention constitute a fixed percentage. This percentage can be conveniently achieved by regulating the amount of water that contributes to formation of Si—O bonds during reaction with organic halosilane. In a preferable mode according to the present invention, during reaction with organic halosilane, the amount of water is such that the amount of Si—O bonds accounts for 20% to 80%, and preferably 30% to 50%, of the bonds of Si atoms that compose the main polymer chain of the resulting polyorganosiloxazane. For example, when the amount of Si—O bonds should be approximately 33 mol %, 0.5 moles of water should be reacted with organic halosilane relative to 1 mole or organic halosilane monomer in which n is 1 as described above. In this case, by reacting a stoichiometrically excessive amount of ammonia as described above, approximately 67 mol % of Si—N bonds are formed from the remaining portion of the main polymer chain.

Furthermore, although not having an effect on the physical properties of the synthesized polymer in this manner, hydrochloric acid is formed due to the reaction between organic halosilane and water. At this time, some hydrogenation occurs as a side reaction resulting in the possibility of the formation of Si—H groups in the polymer. However, this reaction does not occur preferentially, and even if Si—H groups are formed, the amount is 10 mol % or less based on the amount of Si.

Although the polyorganosiloxazane according to the present invention obtained in this manner is a linear or cyclical polymer containing for its main repeating unit —(RSiN$_3$)—, —(RSiN$_2$O)—, —(RSiNO$_2$)— and —(RSiO$_3$)—, it is typically a combination of that linear or cyclical polymer. In the above formulas, R is as was previously defined. These repeating units consisting of —(RSiN$_3$)—, —(RSiN$_2$O)—, —(RSiNO$_2$)— and —(RSiO$_3$)— are present in arbitrary ratios in the polyorganosiloxazane of the present invention. In addition, it is not necessary that their sequence be regular, and is actually irregular. In a preferable mode, the above-mentioned repeating units are present in the polyorganosiloxazane in the ratios of 1–99 parts by weight, 1–50 parts by weight, 1–50 parts by weight and 1–99 parts by weight, respectively, and more preferably, 1–50 parts by weight, 10–4 parts by weight, 5–45 parts by weight and 1–50 parts by weight, respectively.

The number average molecular weight of the polyorganosiloxazane of the present invention is 300 to 100,000, and preferably 400 to 10,000. If the number average molecular weight exceeds 100,000, since crosslinking occurs at normal temperatures, gelling of the polymer is accelerated resulting in difficulties in handling. In addition, if the number average molecular weight is less than 300, it becomes a polymer with a low boiling point causing it to splash during firing resulting in poor physical properties of the ceramic material.

It is preferable that the amount oDf Si—O bonds among the bonds of Si atoms that compose the main polymer chain in the polyorganosiloxazane of the present invention is 20 mol % to 80 mol %, and more preferably 30 mol % to 50 mol %. Here, the bonds of Si atoms that compose the main polymer chain refers to those bonds between Si atoms that compose the polymer skeleton when the polyorganosiloxazane is linear, or bonds between Si atoms that compose the cyclical form or those that compose a linear portion and cyclical portion when the polyorganosiloxazane is cyclical or contains a cyclical portion. If the amount of the above-mentioned Si—O bonds in the polyorganosiloxazane according to the present invention is within the above-mentioned range, as will be described later, it has been clearly demonstrated that the specific dielectric constant of a ceramic material obtained by firing said polyorganosiloxazane is particularly lowered.

As a result of firing the polyorganosiloxazane according to the present invention at 100–700° C., preferably 300–500° C., and more preferably 350–450° C., in air, in a water vapor atmosphere or in a nitrogen or other inert gas atmosphere, a ceramic material can be produced that has excellent thermal resistance and a low specific dielectric constant. Other methods for ceramic conversion such as infrared irradiation and ultraviolet irradiation may also be employed in addition to firing.

In general, in the case of ceramics obtained by firing at 700° C. or lower, since the polyorganosiloxazane is substantially not oxidized irrespective of the firing atmosphere, the percentage of Si—O bonds contained in the polyorganosiloxazane before firing is substantially maintained even after ceramic conversion. However, in the case of firing in air or in a water vapor atmosphere, since more polyorganosiloxazane is oxidized the higher the firing temperature, thereby facilitating the conversion of a portion of the Si—N bonds to Si—O bonds, the amount of Si—O bonds in the resulting ceramics may be larger than the amount of Si—O bonds contained in the polyorganosiloxazane prior to firing. Naturally, there is no such change in the percentage of Si—O bonds when firing in a nitrogen or other inert gas atmosphere.

If the firing temperature is lower than 100° C., the polyorganosiloxazane is not sufficiently converted to a ceramic, while if the firing temperature exceeds 700° C., ceramic conversion proceeds excessively causing the formation of a dense material having an increased dielectric constant. In addition, the residual stress level also increases resulting in greater susceptibility to cracking.

Although there are no particular limitations on the duration of firing, firing is generally performed for 0.5 to 2 hours, and preferably for 0.5 to 1 hour. In addition, the firing atmosphere may be at normal pressure or it may be pressurized.

Any apparatus can be used for the firing apparatus used for firing the polyorganosiloxazane provided it allows control of the above-mentioned production conditions. For example, it is convenient to use a muffle furnace, cylindrical furnace and so forth.

Moreover, in the case of coating the ceramic material having a low specific dielectric constant as described above, it is convenient to use a coating composition composed by blending a solvent into the polyorganosiloxazane according to the present invention.

Examples of solvents of the above-mentioned coating composition include aromatic compounds such as benzene, toluene, xylene, ethylbenzene, diethylbenzene, trimethylbenzene and triethylbenzene, cyclohexane, decahydronaphthalene and dipentene, saturated hydrocarbon compounds such as n-pentane, i-pentane, n-hexane, i-hexane, n-heptane, i-heptane, n-octane i-octane, n-nonane, i-nonane, n-decane and i-decane, ethylcyclohexane, methylcyclohexane and p-menthane, ethers such as dipropylether, dibutylether and dipentylether, as well as ketones such as methylisobutylketone. It is particularly preferable to use xylene or dibutylethier and so forth for the solvent. In addition, in order to regulate evaporation of the solvent, two or more types of solvents can be used as a mixture.

Although the amount of solvent used varies according to the following coating method, the amount used is typically 1.0 to 10,000 parts by weight, and preferably 1.0 to 10 parts by weight, relative to 1 part by weight of polyorganosiloxazane.

The coating composition according to the present invention can be applied to metal materials, inorganic materials and any other ordinary kind of sheets. In addition, it can also be applied to plastic sheets provided the plastic is able to withstand the firing temperature that is applied. As has been described above, ceramic materials obtained by firing the coating composition according to the present invention have the characteristic of being able to maintain a low specific dielectric constant (e.g., 2.7 or less) even after being treated at high temperatures. Since they are particularly useful as interlayer insulating films in next-generation semiconductors having higher levels of integration and achieving higher speeds, their application to coating onto sheets of electronic materials is considered in particular.

Typical coating methods can be used for the coating means, examples of which include immersion, roll coating, bar coating, brush coating, spray coating, flow coating and spin coating.

After coating, the solvent may be removed by drying the coated layer as necessary, followed by firing in the manner described above.

The following provides a detailed explanation of the present invention through its examples.

EXAMPLE 1

After replacing the air in a 1 liter reactor installed in a constant-temperature bath at a temperature of −5° C. with dry nitrogen, 400 mL of dry pyridine were added to the reactor. After waiting until the temperature became constant, 105.75 g (0.5 mol) of phenyltrichlorosilane ($PhSiCl_3$) were gradually added while stirring.

Next, after confirming that the temperature had again become constant, 400 mL of aqueous pyridine containing 4.5 g (0.25 mol) of distilled water were slowly added over the course of about 30 minutes. A temperature rise was observed at that time.

After completion of the reaction, ammonia gas was blown into the reaction mixture after it had reached a predetermined temperature (−5° C.).

The reaction mixture was stirred for about 1 hour after completion of the reaction followed by pressure filtration in the presence of a nitrogen atmosphere to obtain 750 mL of filtrate. Approximately 1000 mL of dry m-xylene were added to this filtrate followed by distilling off the solvent under reduced pressure to obtain 63 g of solid polymer.

The number average molecular weigh of this polymer as measured by gel permeation chromatography was 900. In addition, the weight average molecular weight was 2600.

Figure 1:
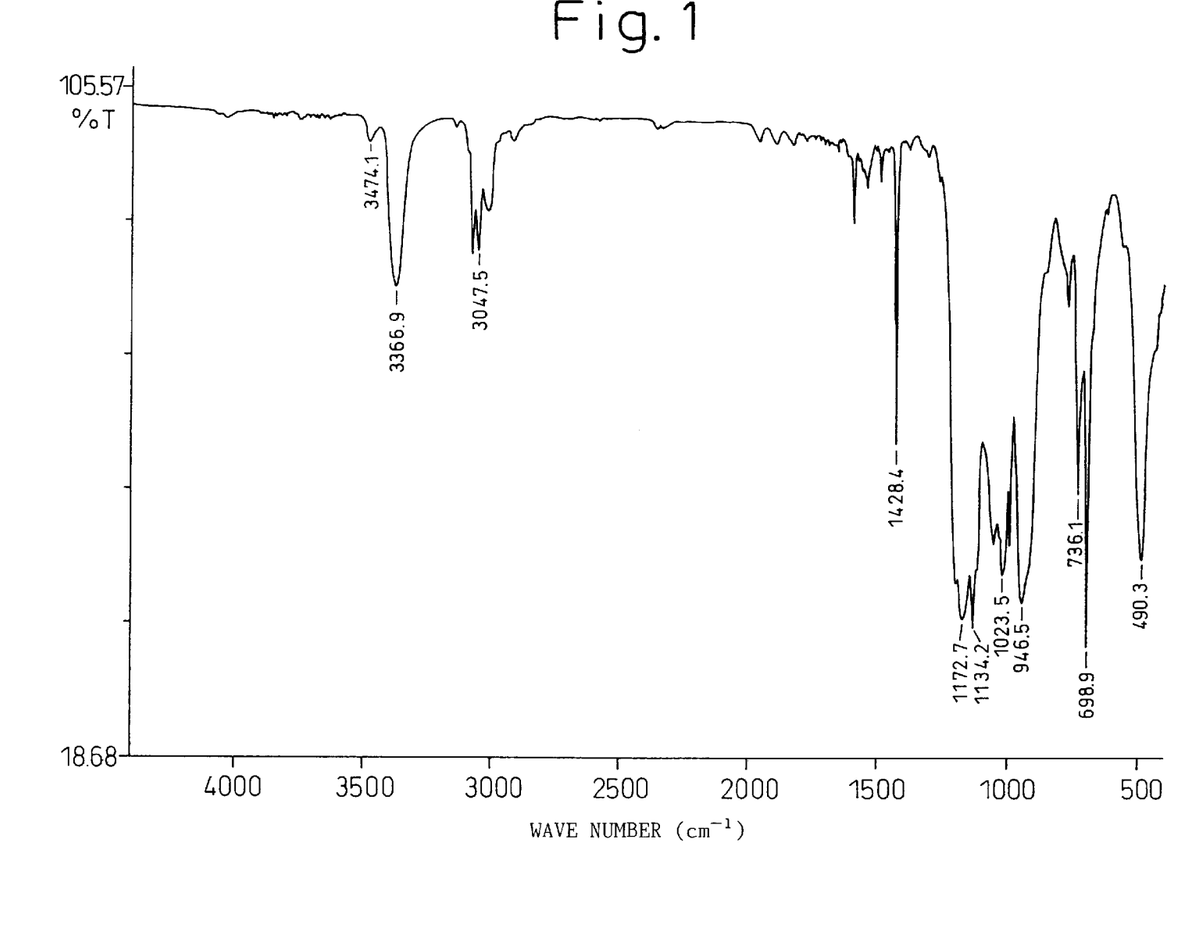
FIG. 1 is a graph representing the spectrum of Fourier transform infrared (FT-IR) spectroscopic analysis of polyphenylsiloxazane obtained in Example 1.

When this polymer was measured by Fourier transform infrared (FT-IR) spectroscopic analysis, absorption based on an NH group was confirmed at a wave number ($cm^{-1}$) of 3366, that based on C—H originating in a benzene ring was confirmed in the vicinity of 3000, that based on Si—O—Si in the vicinity of 1020, that based on Si—N—Si in the vicinity of 950, and that based on Si—Ph in the vicinity of 1400. In addition, although only slight, absorption based on an Si—H group was observed in the vicinity of 2200 that was thought to have been formed by a side reaction with hydrochloric acid. This FT-IR spectrum is shown in FIG. 1.

Figure 2:
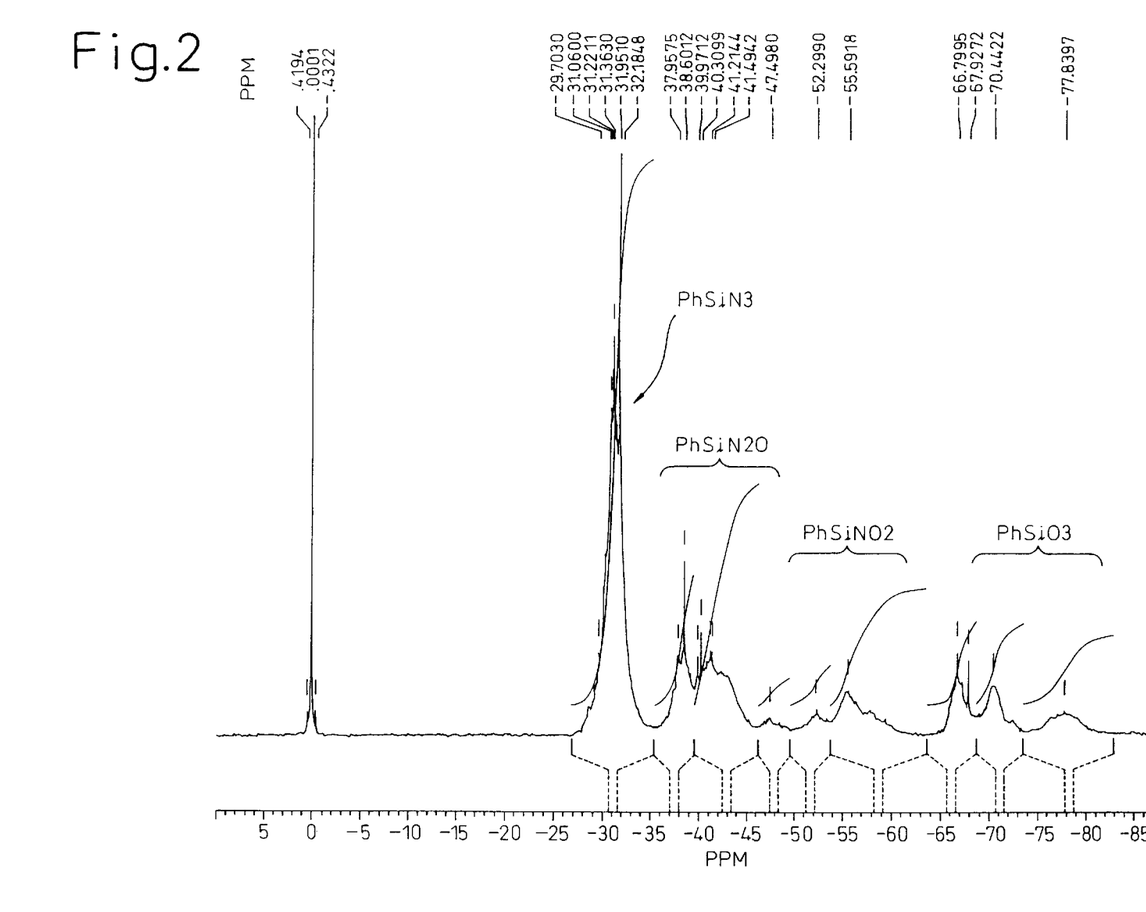
FIG. 2 is a graph representing the spectrum of $^{29}$SiNMR analysis of polyphenylsiloxazane obtained in Example 1.

Moreover, according to the results of $^{29}SiNMR$ analysis, a $PhSiN_3$ signal was observed in the vicinity of −31 ppm, a $PhSiN_2O$ signal was observed in the vicinity of −40 to −50 ppm, a $PhSiNO_2$ signal was observed over the range of −55 to −65 ppm, and a $PhSiO_3$ signal was observed over the range of −70 to −80 ppm, using TMS (tetramethylsilane) for the reference. This NMR spectrum is shown in FIG. 2.

Based on the results of FT-IR and $^{29}SiNMR$ analysis, this polymer was identified as a phenylsiloxazane polymer having in its main chain —(PhSiN$_3$)—, —(PhSiN$_2$O)—, —(PhSiNO$_2$)— and —(PhSiO$_3$)—.

In addition, the percentage of Si—O bonds in the resulting phenylsiloxazane polymer was approximately 34 mol % since 0.25 moles of water were reacted with 0.5 moles of phenyltrichlorosilane.

Next, as a result of performing thermogravimetric analysis (TGA) of this polymer in air, the 5% weight loss temperature was 600° C., indicating that this polymer exhibits a high degree of thermal resistance.

A xylene solution containing 20% by weight of the resulting polyphenylsiloxazane was prepared, after which a film was prepared by coating said solution, onto aluminum vapor deposited on a glass substrate, with a spin coater. This polyphenylsiloxazane film was fired under various conditions (while varying the moisture content in air and firing temperature) to convert it to a ceramic.

Aluminum was deposited on the resulting ceramic film to produce a condenser. As a result of measuring the capacitance of this condenser, a low specific dielectric constant of 2.5 to 2.7 was demonstrated as can be seen from Table 1 below.

TABLE 1

Firing Conditions and Specific Dielectric Constant of Resulting Film

| Firing temperature (° C.) | In dry air | 0.1 KPaH$_2$O | 2 KPaH$_2$O |
| --- | --- | --- | --- |
| 400 | 2.5 | 2.6 | 2.6 |
| 450 | 2.7 | — | — |

EXAMPLE 2

With the exception of increasing the amount of water added to 6.75 g (0.375 mol), polyphenylsiloxazane was synthesized in precisely the same manner as Example 1.

The number average molecular weight of the resulting polymer was 1500, and the weight average molecular weight was 5000. According to the results of FT-IR analysis, there was significant absorption originating in Si—O—Si in the vicinity of 1070 cm$^{-1}$. In addition, according to the results of $^{29}$SiNMR analysis, there was a relative increase in the signal of —PhSiO$_3$— in the vicinity of −70 to −80 ppm.

The percentage of Si—O bonds in the resulting phenylsiloxazane polymer was approximately 50 mol % since 0.375 moles of water were reacted with 0.5 moles of phenyltrichlorosilane.

According to the results of TGA of this polymer in air, the 5% weight loss temperature was 580° C., indicating that this polymer exhibits a high level of thermal resistance.

In addition, when the dielectric constant was measured using the same method as Example 1, the specific dielectric constant of a ceramic film fired under conditions of 400° C. for 1 hour was 2.5.

EXAMPLE 3

After replacing the air in a 1 liter reactor installed in a constant-temperature bath at a temperature of −10° C. with dry nitrogen, 400 mL of dry m-xylene were added to the reactor. After waiting until the temperature became constant, 74.75 g (0.5 mol) of methyltrichlorosilane (MeSiCl$_3$) were added while stirring.

Next, 400 mL of aqueous pyridine containing 4.5 g (0.25 mol) of water were added over the course of about 30 minutes while stirring.

Next, a prescribed amount (4.25 g, 0.25 mol) of ammonia gas was gradually blown in while stirring. After completion of the reaction, the reaction mixture was pressure filtered in the presence of a nitrogen atmosphere to obtain 740 mL of filtrate. The solvent was distilled off from this filtrate under reduced pressure to obtain 30.0 g of a colorless, highly viscous liquid. The number average molecular weight of this highly viscous liquid was 710, and its weight average molecular weight was 2250.

When this polymer was measured by FT-IR, absorption based on an NH group was confirmed at a wave number (cm$^{-1}$) of 3390 and 1178, that based on Si—N—Si in the vicinity of 1020-820, that based on Si—O—Si in the vicinity of 1040, that based on C—H in the vicinity of 2956 and 2898, and that based on Si—Me in the vicinity of 1260.

Moreover, according to the results of $^{29}$SiNMR analysis, signals were observed based on —(MeSiN$_3$)—, —(MeSiN$_2$O)—, —(MeSiNO$_2$)— and —(MeSiO$_3$)—, and this polymer was identified as methylsiloxazane polymer.

In addition, the percentage of Si—O bonds in the resulting methylsiloxazane polymer was approximately 34 mol % since 0.25 moles of water were reacted with 0.5 moles of methyltrichlorosilane.

As a result of performing TGA on this polymer in air, the 5% weight loss temperature was 450° C. Moreover, when the dielectric constant was measured in the same manner as Example 1, the specific dielectric constant of the ceramic film fired under conditions of 400° C. for 1 hour was 2.2.

EXAMPLE 4

With the exception of changing the amount of water reacted with phenyltrichlorosilane, the procedure of Example 1 was repeated. The percentage of Si—O bonds (mol %) among the bonds of Si atoms that compose the main polymer chain of the resulting polyphenylsiloxazane were expressed as the amount of water (mol %) that reacts relative to 100 mol % of phenyltrichlorosilane. Next, the polyphenylsiloxazane was converted to a ceramic by firing under the conditions of 400° C. for 1 hour in the same manner as Example 1 except for firing in air. The dielectric constant of the resulting ceramic film was measured in the same manner as Example 1. A graph in which the specific dielectric constant is plotted versus the percentage of Si—O bonds (mol %) is shown in FIG. 3.

Figure 3:
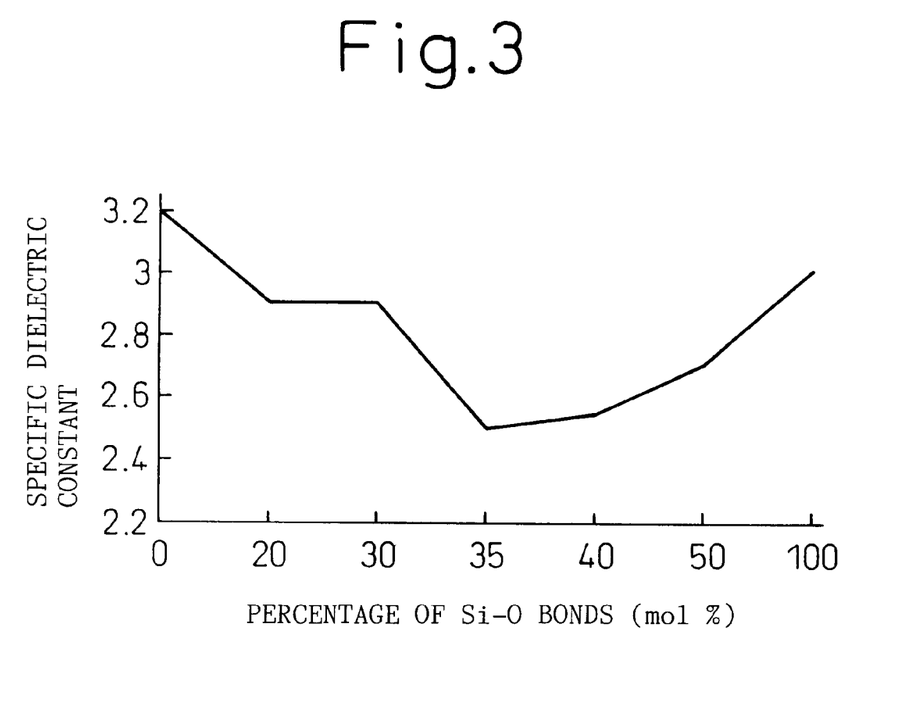
FIG. 3 is a graph representing the relationship between the amount of Si—O bonds in polyphenylsiloxazane and the specific dielectric constant of a ceramic material obtained by firing thereof.
Figure 4:
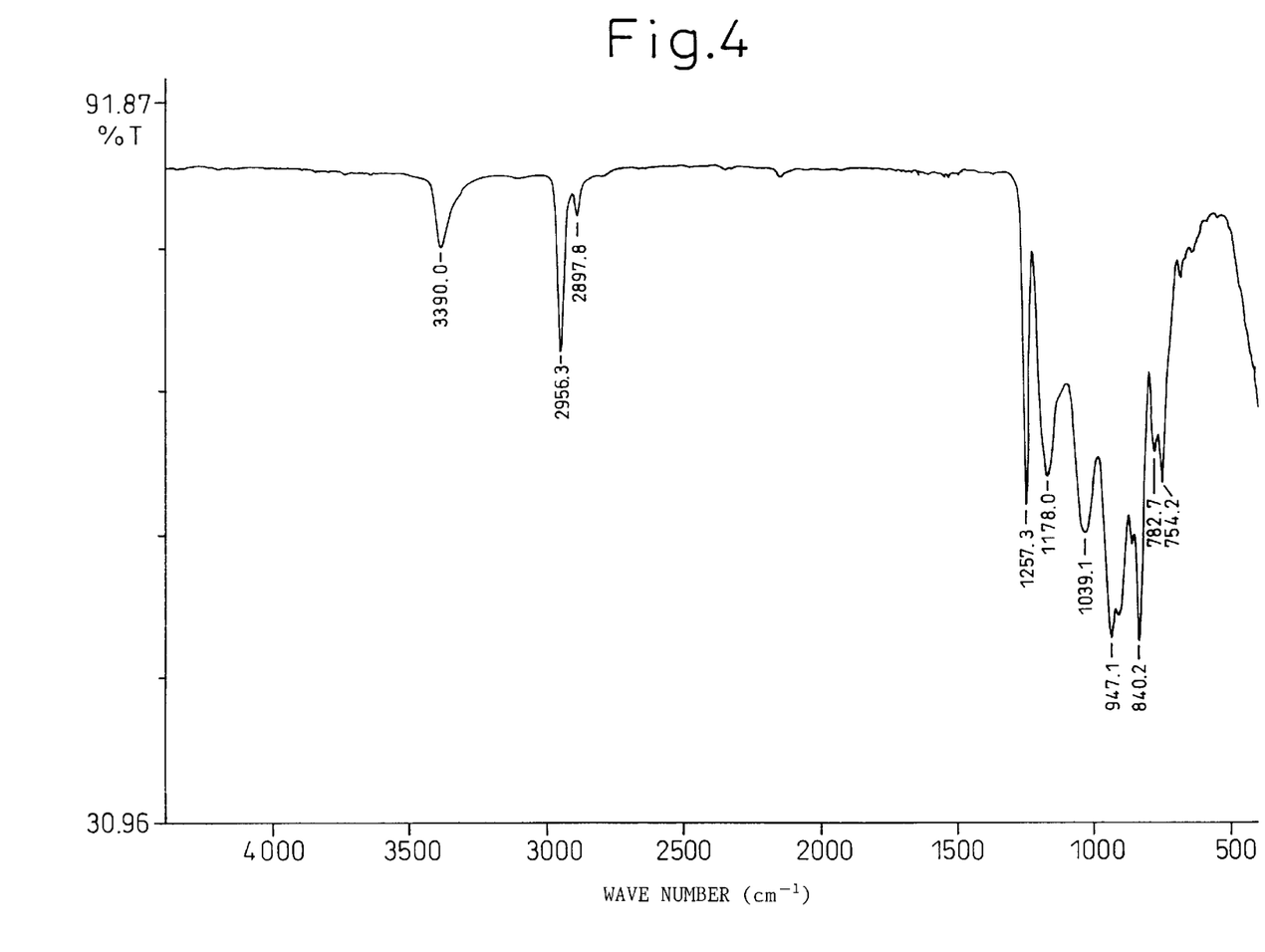
FIG. 4 is a graph representing the spectrum of FT-IR spectroscopic analysis of polymethylsiloxazane obtained in Example 3.

According to FIG. 3, it can be seen that the specific dielectric constant of a ceramic material after firing can be controlled by changing the bond composition (percentage of Si—O bonds) of the polyphenylsiloxazane. In Example 4, the specific dielectric constant of the ceramic material after firing demonstrates the lowest value at an Si—O bond percentage in the polyphenylsiloxazane of about 35 mol %.

INDUSTRIAL APPLICABILITY

Since the polyorganosiloxazane according to the present invention allows a ceramic material to be obtained that exhibits a low specific dielectric constant even when treated at high temperatures, it is suitable for use as a coating for electronic materials, and particularly as a precursor of a semiconductor interlayer insulating film. In addition, since the specific dielectric constant following conversion to ceramics can be controlled by varying the bond composition in the polyorganosiloxazane according to the present invention, a desired specific dielectric constant can be easily obtained.

We claim:

1. Polyorganosiloxazane having a number average molecular weight ranging from 300 to 100,000 and containing as its main repeating units —(RSiN$_3$)—, —(RSiN$_2$O)—, —(RSiNO$_2$)— and —(RSiO$_3$)—, wherein R represents an alkyl group, alkenyl group, cycloalkyl group, aryl group, alkylamino group or alkylsilyl group.

2. Polyorganosiloxazane as set forth in claim 1 wherein the percentage of Si—O bonds among bonds of Si atoms that compose the main polymer chain is 20 to 80 mol %.

3. Polyorganosiloxazane as set forth in claim 1 wherein the percentage of Si—O bonds among bonds of Si atoms that compose the main polymer chain is 30 to 50 mol %.

4. Polyorganosiloxazane as set forth in claim 1, wherein R is selected from the group consisting of phenyl, methyl and cycloalkyl.

5. A method of preparing polyorganosiloxazane comprising reacting an organic halosilane, represented by the general formula R$_n$SiX$_{4-n}$, wherein R represents an alkyl group, alkenyl group, cycloalkyl group, aryl group, alkylamino group or alkylsilyl group, X represents a halogen atom, and n represents an integer of 1 or 2, with ammonia and water.

6. The method as in claim 5, wherein R is a phenyl group.

7. The method as in claim 5, wherein R is a methyl group.

8. The method as in claim 5, wherein during said reaction, the amount of said water is the amount wherein the percentage of Si—O bonds among bonds of Si atoms that compose the main polymer chain of the resulting polyorganosiloxazane is 20 to 80 mol %.

9. The method as in claim 8, wherein said percentage of Si—O bonds is 30 to 50 mol %.

10. A ceramic material having a specific dielectric constant of 2.7 or less obtained by converting, to a ceramic material, polyorganosiloxazane having a number average molecular weight ranging from 300 to 100,000 and containing as its main repeating units —(RSiN$_3$)—, —(RSiN$_2$O)—, —(RSiNO$_2$)— and —(RSiO$_3$)—, wherein R represents an alkyl group, alkenyl group, cycloalkyl group, aryl group, alkylamino group or alkylsilyl group.

11. The ceramic material as in claim 10 wherein R is a phenyl group.

12. The ceramic material as in claim 10 wherein R is a methyl group.

13. The ceramic material as in claim 10, wherein said conversion to a ceramic material includes a step consisting of firing at a temperature of 100–700° C.

14. The ceramic material as set forth in claim 13 wherein said firing step is performed in a nitrogen atmosphere.

15. Polyorganosiloxazane as set forth in claim 2, wherein R is selected from the group consisting of phenyl, methyl and cycloalkyl.

16. Polyorganosiloxazane as set forth in claim 3, wherein R is selected from the group consisting of phenyl, methyl and cycloalkyl.

17. The method as in claim 6, wherein during said reaction, the amount of said water is the amount wherein the percentage of Si—O bonds among bonds of Si atoms that compose the main polymer chain of the resulting polyorganosiloxazane is 20 to 80 mol %.

18. The method as in claim 7, wherein during said reaction, the amount of said water is the amount wherein the percentage of Si—O bonds among bonds of Si atoms that compose the main polymer chain of the resulting polyorganosiloxazane is 20 to 80 mol %.

19. The ceramic material as in claim 11, wherein said conversion to a ceramic material includes a step consisting of firing at a temperature of 100–700° C.

20. The ceramic material as in claim 12, wherein said conversion to a ceramic material includes a step consisting of firing at a temperature of 100–700° C.

* * * * *